United States Patent [19]

Torzewski

[11] Patent Number: 5,758,882
[45] Date of Patent: Jun. 2, 1998

[54] SCREENED GASKET FOR HIGH PRESSURE FLUID TRANSMISSION APPLICATIONS

[75] Inventor: Leo F. Torzewski, Houston, Tex.

[73] Assignee: Pipeline Seal & Insulator, Inc., Huston, Tex.

[21] Appl. No.: 788,737

[22] Filed: Jan. 24, 1997

[51] Int. Cl.⁶ ............................................. F16J 15/02
[52] U.S. Cl. ............................................. 277/608; 277/918
[58] Field of Search ........................ 277/23, 24, 207 A, 277/171; 210/445, 450, 495

[56] References Cited

U.S. PATENT DOCUMENTS

| | | | |
|---|---|---|---|
| 1,329,398 | 2/1920 | Hachmann | 210/495 |
| 2,316,526 | 4/1943 | McDonald | 210/495 |
| 3,382,985 | 5/1968 | Muehl | 210/495 |
| 3,671,046 | 6/1972 | Hagmann | 277/170 |
| 3,784,011 | 1/1974 | Ward | 210/445 |
| 3,877,895 | 4/1975 | Wonderland et al. | 55/97 |
| 4,132,649 | 1/1979 | Croopnick et al. | 210/347 |
| 4,362,621 | 12/1982 | Dobna et al. | 210/450 |
| 4,379,051 | 4/1983 | Hiesinger et al. | 264/255 |
| 4,414,172 | 11/1983 | Leason | 264/255 |
| 4,512,790 | 4/1985 | Faure et al. | 65/13 |
| 4,664,800 | 5/1987 | Raines et al. | 210/445 |
| 4,685,472 | 8/1987 | Muto | 128/760 |
| 4,826,898 | 5/1989 | Cain | 210/445 |
| 4,882,052 | 11/1989 | Peranio | 210/282 |
| 5,147,545 | 9/1992 | Despard et al. | 210/450 |
| 5,292,432 | 3/1994 | Jainek et al. | 210/445 |
| 5,316,320 | 5/1994 | Breaker | 277/207 A |
| 5,536,405 | 7/1996 | Myrna et al. | 210/445 |
| 5,564,715 | 10/1996 | Wallace | 277/207 A |

FOREIGN PATENT DOCUMENTS 396385  11/1990  European Pat. Off. ............ 210/495

OTHER PUBLICATIONS

"Tackle Flange Leaks and Blowouts", (1989) Pipeline Seal and Insulator, Inc., Houston, Texas 77021.

Primary Examiner—Scott Cummings
Attorney, Agent, or Firm—Graham & James

[57] ABSTRACT

A screened gasket for sealing a junction and filtering fluid flowing through the junction includes a sandwich-type structure with first and second gasket members holding a central screen securely therebetween. An inner seal annularly surrounds the screen and prevents radial fluid leakage between the two gasket members. Outer seals are provided which engage the surfaces of the flanges of the junction.

18 Claims, 3 Drawing Sheets

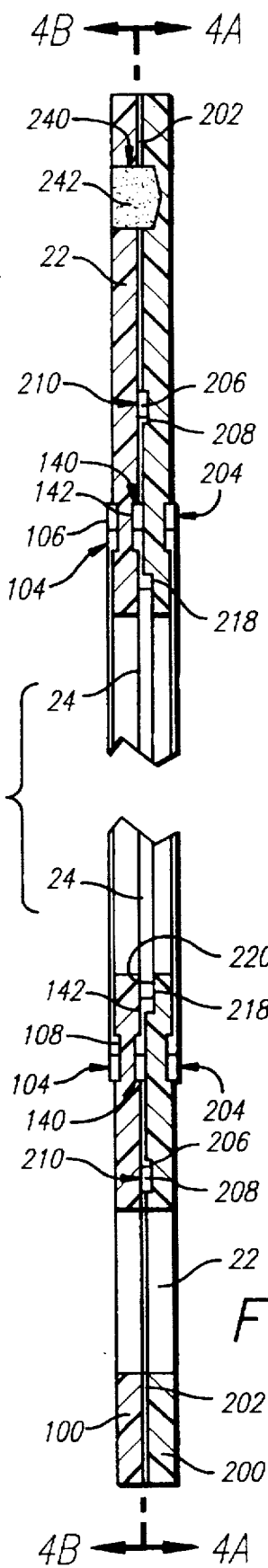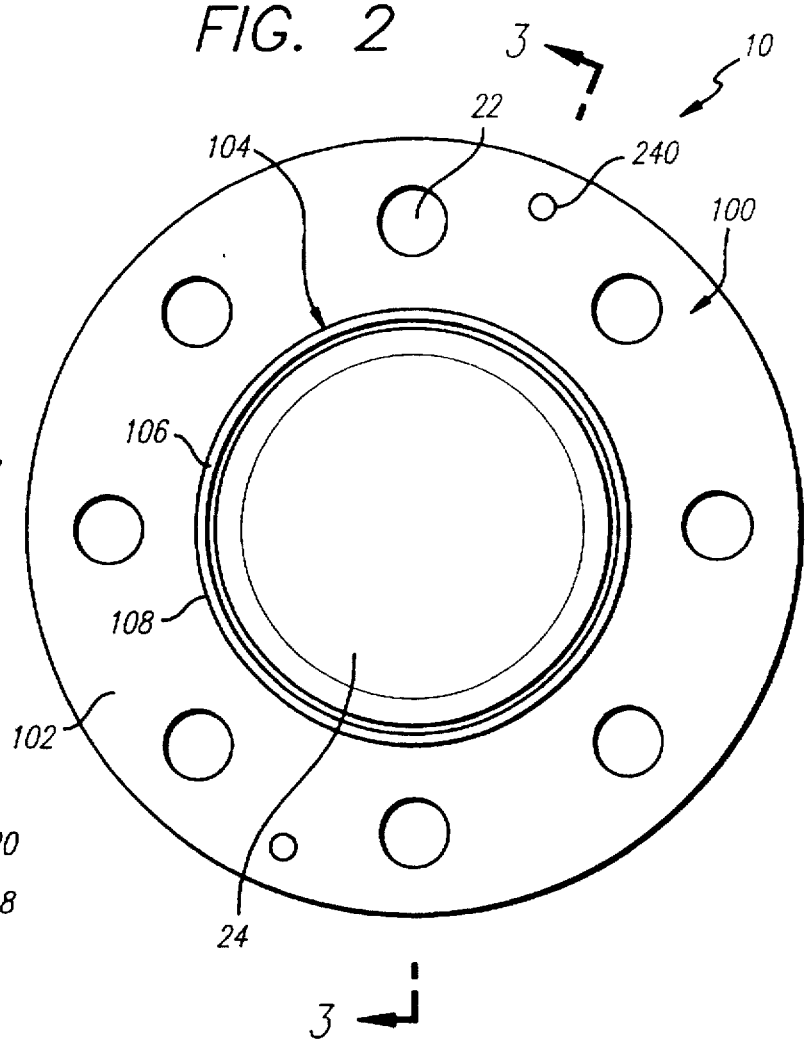

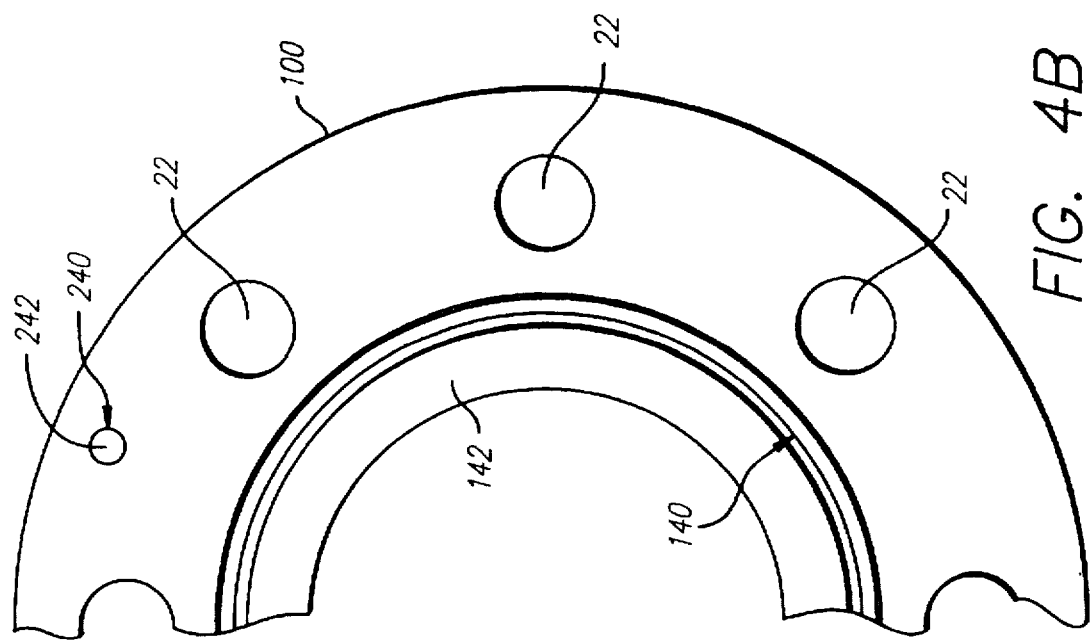
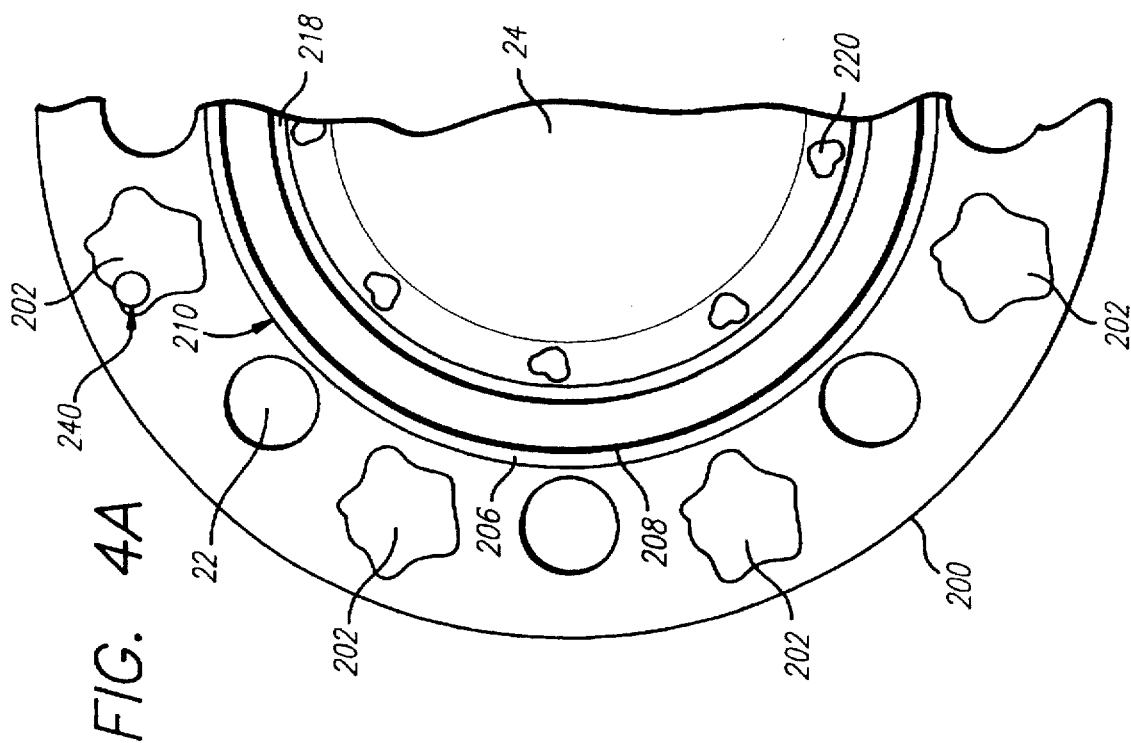

SCREENED GASKET FOR HIGH PRESSURE FLUID TRANSMISSION APPLICATIONS

BACKGROUND OF THE INVENTION

1. Field of the Invention

The present invention relates to fluid transmission applications and gaskets adapted for sealing junctions between components employed in such liquid or gas transmission applications. More particularly, the present invention relates to screened gaskets adapted for providing filtering as well as sealing between such fluid transmission components.

2. Description of the Prior Art and Related Information

In a variety of fluid transmission applications, it is of key importance to ensure that junctions between various components of the transmission system which are joined together in the field during assembly of the transmission system are sealed such that escape of fluid through the junction is prevented. One example of such a transmission system where sealing is of critical importance is in natural gas pipeline and distribution systems. In such applications leaks of gas through the junctions where the components of the system are assembled cannot be tolerated. One common junction between two components in a natural gas transmission system is formed by two mating flanges which are bolted or otherwise secured together. This junction is typically sealed through some type of gasket configured to match the size and shape of the flanges.

It is also frequently desirable to provide some course filtering capability at various locations in the fluid transmission system. For example, at some point in a natural gas transmission system the gas transmission pipeline or distribution network will typically flow through a monitoring device such as a gas flow rate meter. Various contaminants being carried along by the gas flow can cause damage to the monitoring equipment. For example, welding slag, shavings from plastic pipes, dirt, and a variety of other potential contaminants can clog or damage the equipment used in flow rate meters and other types of monitoring equipment.

To provide such filtering, a filter may be incorporated in the seal used at the junctions in the transmission system. Such a combined filter and seal may comprise a gasket incorporating a wire or plastic mesh screen affixed across the central opening where the fluid flows. The use of such a combined filter and sealing gasket can also provide monitoring advantages for preventative maintenance. As contaminants are trapped by the screen, they will cause the fluid flow through the gasket to decrease. This drop in fluid flow can in turn be detected by a flow meter in time for a maintenance crew to clean or replace the gasket before a complete blockage in flow occurs or more serious problems are caused by the contaminants flowing through the fluid.

Although a simple screened gasket employing a wire or plastic mesh screen affixed over the central opening in the gasket may be suitable for certain applications, in other applications characterized by higher flow rate or higher pressures such a simple configuration may not be adequate. For example, by merely adhesively bonding a plastic or metal screen across the opening of a gasket seal, the screen will tend to pull away from the gasket material. It is therefore difficult or impossible to achieve the desired strength for high pressure or high fluid flow applications using an adhesively bonded screen and cost effective materials.

Extending the screen mesh across the entire gasket will take advantage of the compressive force between the two flanges in the system and can greatly increase the resistance of the screen to being pulled away from the gasket. However, this approach inevitably compromises the sealing capability of the gasket as the mesh extends to the holes in the gasket adapted for securing the gasket to the flange. Fluid may thus leak out of the junction through the screen mesh and the mounting holes in the gasket and flanges.

Therefore, a problem presently exists in providing an effective filtering and sealing gasket for relatively high pressure and/or high fluid flow rate applications while at the same time maintaining a simple and cost effective structure which is easy to fabricate.

SUMMARY OF THE INVENTION

The present invention provides a solution to the above-noted problem. More particularly, the present invention provides a readily manufactured gasket which also provides filtering capabilities for a variety of fluid transmission applications including applications involving relatively high pressures and/or relatively high fluid flow rates.

In a first aspect, the present invention provides a gasket for sealing a junction which includes first and second annular gasket members affixed together. The first annular gasket member has a generally circular central opening, an outer surface for engaging one surface of the junction and an inner surface. An outer seal is provided on the outer surface surrounding the central opening and an inner seal is provided on the inner surface surrounding the central opening. The second annular gasket member similarly has a generally circular central opening, an outer surface for engaging another surface of the junction, an inner surface, an outer seal on the outer surface surrounding the central opening, and an inner seal on the inner surface surrounding the central opening. A generally circular screen is affixed to the inner surface of said first and second gasket members inner of said inner seal so as to be sandwiched between said gasket members and so as to extend across the central opening. This "sandwich" structure firmly holds the screen in place while the inner and outer seals prevent fluid leakage between the two gasket members and between the gasket and junction surfaces, respectively.

In applications where electrical isolation is desirable, the first and second gasket members may be composed of a rigid dielectric material. For example, the dielectric material may be a phenolic resin. The first and second gasket members may be adhesively bonded together on their respective inner surfaces outward of the inner seal. Since the fastening of the two components together at the junction will provide a compressive force on the gasket, the two gasket members will be held together securely and the strength of the adhesive bond is not critical. The screen may also be adhesively bonded to the inner surface(s) of the first and/or second gasket members.

The outer seals may preferably each comprise an annular sealing element composed of a deformable material and affixed to the respective outer surface. The respective outer surfaces of each of said gasket members may each have a shallow annular channel and the annular seal may be adhesively bonded in the shallow channel. The bottom of the annular channel may be tapered so as to provide a tighter seal as a compressive force is applied to the gasket. The first and second inner seals may similarly each comprise an annular sealing element composed of a deformable material with the sealing element of the second inner seal configured radially outward of the said first inner seal. The inner surfaces of the first and second gasket members may include respective first and second inner annular channels, with the annular sealing elements affixed in the respective annular channels. This provides a simple but effective seal preventing fluid leakage between the two gasket members and between the gasket outer surfaces and the junction surfaces to be sealed.

Further aspects of the present invention will be appreciated from the following description of a presently preferred embodiment.

BRIEF DESCRIPTION OF THE DRAWINGS

FIG. 2 is a front view of the screened gasket of the present invention in a preferred embodiment adapted for use in the application shown in FIG. 1.

FIG. 3 is a side sectional view of the gasket of FIG. 2 taken along lines 3—3 illustrated in FIG. 2.

FIGS. 4A and 4B are end views of the inside of the gasket of FIGS. 2 and 3 taken along lines 4A and 4B illustrated in FIG. 3, respectively.

DETAILED DESCRIPTION OF THE INVENTION

Figure 1A:
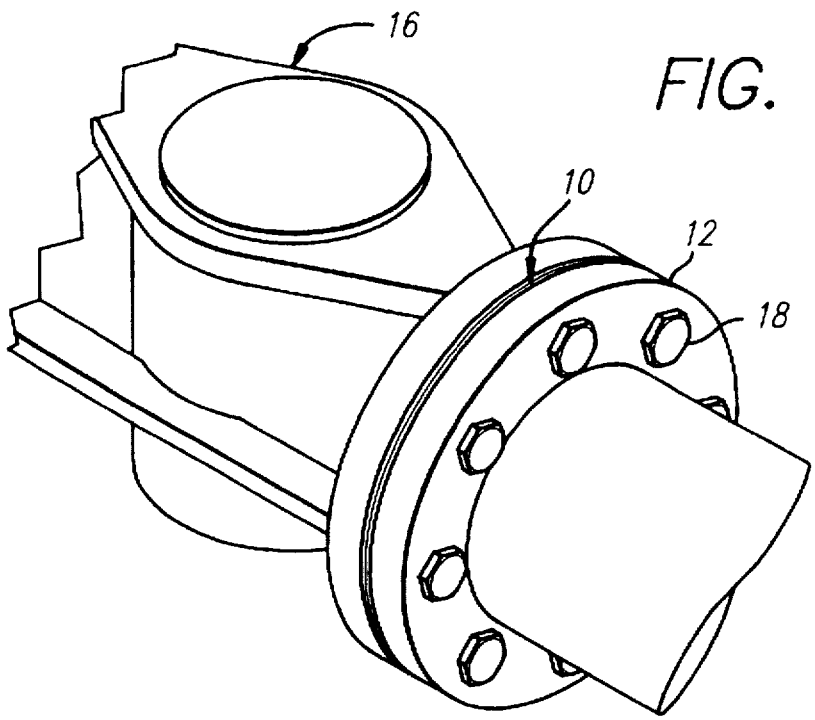
FIGS. 1A and 1B are perspective and exploded views of the screened gasket of the present invention in one preferred application in a junction in a fluid transmission system with flanges having a plurality of mounting holes.
Figure 1B:
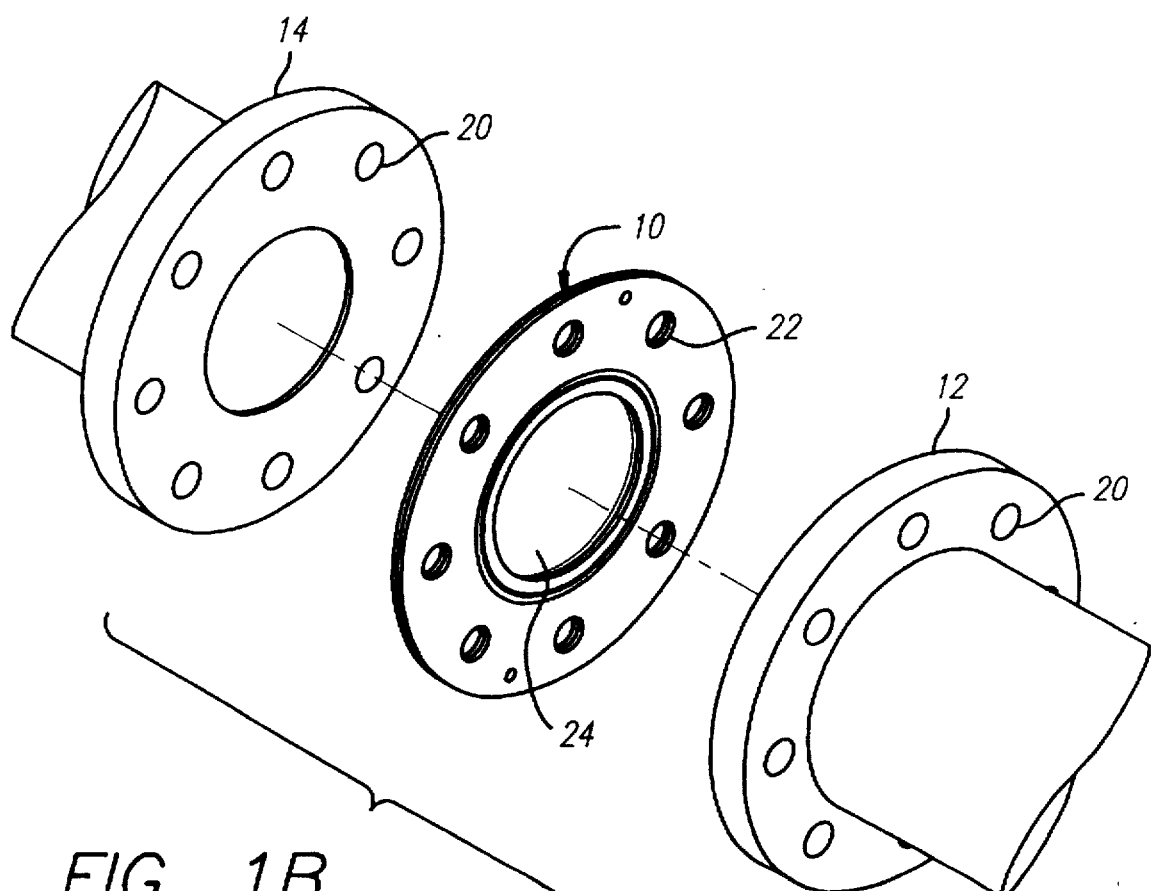

Referring to FIGS. 1A and 1B the screened gasket of the present invention is illustrated in one preferred application in a fluid transmission system such as a natural gas transmission system. As illustrated, the screened gasket 10 of the present invention may be configured with a size and shape so as to provide a seal between two annular flanges 12 and 14 which serve to couple perspective components of the gas transmission system. As illustrated generally in FIG. 1A, one application where the screened gasket of the present invention may be advantageously employed is at the point in a gas distribution system where the gas flows into a flow valve 16, which in turn will provide the gas to monitoring equipment such as a flow rate meter. The screened gasket of the present invention serves to remove contaminants from the gas flow prior to entry into the monitoring equipment, which equipment may include sensitive devices which could potentially be damaged by such contaminants. It will be appreciated, however, that such a potential application is purely illustrative in nature and the present invention may be equally employed in a variety of other applications and a variety of other fluid transmission and distribution systems.

As further shown in FIGS. 1A and 1B, the flanges 12 and 14 sealed by the gasket 10 are coupled together through bolts 18 which engage matching holes 20 in the flanges. To accommodate this flange mounting system, the gasket 10 includes matching annularly spaced holes 22. It will be appreciated, however, that the means for mounting the gasket 10 to the flanges may be suitably modified to accommodate a variety of other mounting approaches of the flanges to each other. As is also illustrated in FIG. 1B, the gasket 10 includes a central opening covered by a screen 24, the opening generally matching that of the flanges 12 and 14. Although a circular opening is shown, any shape adapted for a particular flange shape may equally be employed. Screen 24 has a mesh size adapted to catch the contaminants of concern in the gas flow while at the same time allowing the desired rate of fluid flow through the flanges 12, 14 and gasket 10. Thus, the mesh size of screen 24 will vary with the specific application. For example, in a natural gas transmission system application, 12 mesh is currently a preferred mesh size. Mesh sizes such as 60, 80 and 100 may also be employed. The gasket central opening may have dimensions from ½ inch to 12 inches in diameter, however larger or smaller diameter openings may be employed. These dimensions and mesh sizes are thus purely illustrative.

Referring to FIG. 2, a front view of the screened gasket 10 of the present invention is illustrated in a preferred embodiment corresponding to the application illustrated in FIGS. 1A and 1B and described above. The front and back of the gasket are of identical construction so the view illustrated in FIG. 2 is equally representative of both front and back sides of the gasket. Also, as will be described in more detail below, the screen 24 is mounted in the gasket in a manner which is not sensitive to the fluid flow direction and therefore the gasket can may be installed without concern to the fluid flow direction while providing equal resistance to separation of the screen 24.

As will be described in more detail below, the gasket 10 includes a first annular gasket member 100 and a matching second gasket member (illustrated by numeral 200 in FIGS. 3 and 4A. First gasket member 100 and matching second gasket member 200 (shown in FIGS. 3 and 4A) may be composed of rigid or semirigid material having the desired electrical properties. For example, where an insulating material is desired, any one of a number of dielectric materials may be employed. For example, various ceramic, epoxy glass, glass, Lucite, melamine, phenolic resin, polyester glass, polyethylene, polyphenol ether, pyrox, silicone glass, or vinyl materials are all potentially suitable depending upon the specific application and cost considerations. If an insulating material is not desired, a metallic material may be employed. For example, any one of the following metal materials may be employed in suitable applications and again depending on the cost and structural constraints of this specific application: aluminum, brass, carpenter 20, carbon steel, cast iron, clad steel materials, copper, ductile iron, hastelloy B, hastelloy C, hastelloy X, inconel X, monel, nickel 200, soft iron, stainless steel, tantalum, tin, titanium and vanadium. For the specific above-noted natural gas application an insulating gasket material is desired and a phenolic resin material is presently preferred due to its relative ease of fabrication in the desired shapes and its good structural and insulating properties.

Still referring to FIG. 3, the outer surface 102 of the first gasket member 100 includes a seal 104 for providing an annular seal with the mating surface of the flange for preventing outward radial flow of fluid at the junction sealed by the gasket. As illustrated in FIG. 3 in cross section, the second gasket member 200 includes a matching seal 204. In the presently preferred embodiment, the seal 104 (and matching seal 204 shown in FIG. 3) preferably comprise a one-piece annular sealing element 106 adhesively bonded to the surface 102 or otherwise permanently affixed thereto. The sealing element 106 may be composed of any of a number of suitable resiliant sealing materials including: buna-N, buna-S, butyl, EPDM, hypolon, kel-F®, natural rubbers, neoprene, nylon, polyimide, polyurethane, silicone rubber, Teflon®, vinyl or Viton®. These various materials are well known in the art and have various advantages depending upon the price constraints and performance requirements of the particular application. The sealing element 106 may be configured in a shallow channel 108 in the surface 102 of the gasket member. This shallow channel 108 may optionally have a beveled bottom surface so as to cause an outward compressive force on the sealing element when the flanges are tightly bolted together. The specific nature of such channel and associated sealing element are described in U.S. Pat. No. 3,671,046, the disclosure of which is incorporated herein by reference.

Referring to FIGS. 3 and 4A and 4B, the inner surfaces of the first and second gasket members 100, 200 and the "sandwich-type" structure of the gasket members and screen 24 are illustrated in more detail in a presently preferred embodiment. More specifically, in FIG. 3, the assembled gasket 10 is illustrated in cross section showing the first gasket member 100 and second gasket member 200 adhesively bonded together and holding the screen 24 therebetween in a sandwich-type structure. In FIGS. 4A and 4B in turn, the inner surfaces of the second gasket member and first gasket member 100, respectively, are illustrated in a manner showing the inner seal and the mounting of the screen to the inner surfaces of the gasket.

More specifically, referring to FIGS. 3, 4A and 4B, the gasket 10 as assembled includes first gasket member 100 and second gasket member 200 affixed together in a suitable manner. For example, an adhesive 202 may be employed. A variety of other suitable means for affixing the first and second gasket members may equally be employed, however. Since the first and second gasket members will be forced together by the compressive action of the bolts or other fastening means used to secure the junction being sealed by the gasket, the manner of affixing the first and second gasket members together need not be adapted for providing undue structural support. If desired, additional structural support may be provided by providing matching holes 240 in the first and second gasket members and filling them with an epoxy 242. Also, in a presently preferred embodiment, the means for affixing the first and second gasket members, illustrated as an adhesive in FIG. 3, need not provide internal sealing for preventing fluid flow radially outward from the space between the first and second gasket members. This sealing function preferably is provided by one or more inner seals annularly surrounding the central opening and screen 24. For example, as illustrated in FIG. 3 and 4A, an inner seal 210 may be provided on the inner surface of the second gasket member 200 to annularly surround the inner opening end screen 24. Inner seal 210 may take the form of an annular sealing element 206 configured in a shallow channel 208 in the same manner as the outer seal 104 described in relation to FIG. 2. This sealing element and channel embodiment of the seal may also optionally employ the teachings of U.S. Pat. No. 3,671,046 as discussed above in relation to the outer seal. When the gasket 10 is assembled in the junction being sealed, this inner seal will be compressed against the inner surface of the first gasket member 100 forming an effective seal against radial leakage of the fluid.

Referring to FIGS. 3 and 4B, the first gasket member 100 may also, optionally, include an inner seal 140 mounted on the inner surface thereof and annularly surrounding the central opening and screen 24. This annular seal 140 may be constructed in an identical manner to the inner seal 210 merely being configured radially inward thereof. This double inner seal provides a very secure radial seal making the manner of bonding the first and second gasket members together, or otherwise affixing the two members, less sensitive to process control without sacrificing the sealing ability of the gasket.

Still referring to FIGS. 3, 4A and 4B, one or both of the first and second gasket members 100, 200 include an annular recess which receives the outer circumference of the screen 24. In FIGS. 3 and 4A, this is shown as recess 218 in the inner surface of second gasket member 200. Screen 24 is affixed in place in the recess 218, and against surface 142, by an adhesive 220 or other suitable means for affixing the screen to one or both of the gasket members.

Accordingly, it will be appreciated that the integral structure formed by the first gasket member 100, second gasket member 200 and screen 24 provides a very effective gasket with a securely mounted central screen for providing filtering of contaminants in a variety of applications including applications involving relatively high pressure and/or a high rate of fluid flow through the screen. Furthermore, it will be appreciated that despite the sandwich-type structure of the gasket it is relatively impervious to outward radial flow of fluid without requiring any complex or carefully controlled process for assembling and affixing together the first and second gasket members.

A brief description of the manner in which the individual components of the gasket 10 may be readily assembled will clearly illustrate the manufacturing cost advantages of the present invention. As noted above, in one presently preferred embodiment, the first and second gasket members may be formed of a readily molded and fabricated phenolic resin material. The gasket members are formed with the channels on the inner and outer surfaces thereof annularly surrounding the central opening and adapted to receive the sealing elements. Sealing elements of rubber or synthetic material may then be readily bonded into the channels in both the inner and outer surfaces of the gasket members. After this bonding step each of the first and second gasket members thus has both an inner and outer annular sealing element bonded in the matching channel. The screen 24 may then be adhesively bonded to one or the other of the first and second gasket members in the receiving recesses (e.g. recess 218). The first and second gasket members may then be affixed together, for example, through adhesive bonding to form the complete gasket structure. Since the inner sealing elements prevent the radial outward flow of fluid through the internal space between the first and second gasket members, a simple spot adhesive bonding as generally illustrated by adhesive 202 in FIG. 4A may be employed for this step of affixing the first and second gasket members. If desired, additional structural support may be provided by drilling holes 240 through one of the gasket members part way into the other (as shown in FIG. 3). These holes 240 may then be filled with an epoxy which more securely holds the two gasket members together after the epoxy dries.

Accordingly, it will be appreciated that an extremely straightforward manufacturing process nonetheless results in a reliable and durable gasket incorporating a central screen for filtering of contaminants.

While the present invention has been described in terms of a presently preferred embodiment adapted for one application, it will be appreciated that a variety of other applications and other embodiments are equally possible while remaining within the scope of the present invention. Accordingly, the above-described embodiment is purely illustrative in nature and should not be viewed as limiting in any way.

What is claimed is:

1. A gasket adapted for sealing a junction between two fluid carrying conduits and for filtering relatively large particles from the fluid without substantially impeding fluid flow through the junction, the gasket comprising:

a first gasket member having a central opening, an outer surface for engaging one surface of the junction, a first outer seal on the outer surface surrounding the central opening, an inner surface, and a first inner seal on the inner surface surrounding the central opening;

a second gasket member having a central opening, an outer surface for engaging the mating surface of the junction, a second outer seal on the outer surface surrounding the central opening, and an inner surface;

a screen affixed to the inner surface of at least one of said first and second gasket members radially inside of said first inner seal, said screen extending across said central opening; and means for affixing said first and second gasket members together; and wherein the second gasket member further comprises a second inner seal on the inner surface thereof.

2. A gasket as set out in claim 1, wherein said first and second gasket members are composed of a rigid dielectric material.

3. A gasket as set out in claim 2, wherein said dielectric material is a phenolic resin.

4. A gasket as set out in claim 1, wherein said screen is adhesively bonded to the inner surfaces of the first and second gasket members.

5. A gasket as set out in claim 1, wherein the means for affixing said first and second gasket members comprises an adhesive bonding the respective inner surfaces of the gasket members together.

6. A gasket as set out in claim 1, wherein said screen is composed of a metal mesh.

7. A gasket as set out in claim 1, wherein said first and second outer seals each comprises a one-piece annular sealing element composed of a deformable material and affixed to the respective outer surfaces of said first and second gasket members.

8. A gasket as set out in claim 7, wherein the respective outer surfaces of said first and second gasket members each have a shallow annular channel and wherein the annular sealing element is adhesively bonded in the shallow channel and extends above the channel to form an exposed annular sealing surface.

9. A gasket as set out in claim 1, wherein the first and second inner seals each comprises an annular sealing element composed of a deformable material and wherein the annular sealing element of said second inner seal is configured radially outward of that of said first inner seal.

10. A gasket as set out in claim 9, wherein the inner surfaces of said first and second gasket members include respective first and second inner annular channels, the second annular channel configured outwardly of said first annular channel and wherein the annular seals are affixed in the respective annular channels.

11. A gasket as set out in claim 1, wherein the junction includes annular flanges having a plurality of bolts therethrough and wherein the first and second gasket members include a plurality of holes for receiving the bolts therethrough configured radially outward of said first inner seal and first and second outer seals.

12. A gasket as set out in claim 1, wherein the respective inner surfaces have an inner recess about the central opening which receives the perimeter of the screen.

13. A method for fabricating a gasket comprising:

providing a first gasket member having a central opening, an outer surface and an inner surface;

affixing a first annular seal to the outer surface of the first gasket member;

affixing a second annular seal to the inner surface of said first gasket member;

providing and affixing a screen to the inner surface of the first gasket member, the screen having a diameter sufficient to extend across the central opening;

providing a second gasket member having an inner surface, an outer surface and a central opening matching the dimensions of the central opening in the first gasket member;

affixing a third annular seal to the outer surface of said second annular gasket member; and affixing the second gasket member to the first gasket member at the inner surface thereof; and further comprising the step of affixing a fourth annular seal to the inner surface of said second gasket member at a radial position outward of said second annular seal.

14. A method for fabricating a gasket as set out in claim 13, wherein said step of affixing said second gasket member to said first gasket member comprises adhesive bonding.

15. A method for fabricating a gasket as set out in claim 14, wherein said step of adhesive bonding comprises spot bonding.

16. A method for fabricating a gasket as set out in claim 13, wherein said step of affixing a screen comprises adhesively bonding the outer periphery of the screen to the inner surface of the first gasket member.

17. A method for fabricating a gasket as set out in claim 14, wherein said step of affixing said second gasket member to said first gasket member further comprises providing one or more holes extending through said first gasket member part way into said second gasket member and filling said holes with an epoxy.

18. A method as set out in claim 17, wherein said step of providing one or more holes comprises drilling the holes.

* * * * *